United States Patent [19]
O'Shea

[11] Patent Number: 6,036,161
[45] Date of Patent: Mar. 14, 2000

[54] SANDBAR SYSTEM

[76] Inventor: Teresa M. O'Shea, 101 Summit Ave., Hatboro, Pa. 19040

[21] Appl. No.: 09/249,250

[22] Filed: Feb. 12, 1999

[51] Int. Cl.[7] ............................ A01K 97/10; F16M 13/00
[52] U.S. Cl. ............................ 248/532; 248/518; 248/530
[58] Field of Search ................................. 248/511, 518, 248/519, 524, 530, 532, 533, 544, 545, 156, 222.52; 52/165, 153, 154, 155, 156, 157

[56] References Cited

U.S. PATENT DOCUMENTS

| | | | |
|---|---|---|---|
| 3,727,357 | 4/1973 | Stillman, Jr. | 52/154 |
| 4,040,214 | 8/1977 | Frye | 52/157 |
| 4,753,411 | 6/1988 | Lechner et al. | 248/533 |
| 5,271,196 | 12/1993 | Fanti | 52/166 |
| 5,293,889 | 3/1994 | Hall et al. | 135/16 |
| 5,339,847 | 8/1994 | Kanter et al. | 135/16 |
| 5,524,855 | 6/1996 | Lesar | 248/530 |
| 5,529,273 | 6/1996 | Benthin | 248/254 |

Primary Examiner—Anita M. King
Assistant Examiner—David Heisey

[57] ABSTRACT

A sand bar system including a lower support bar. The lower support bar is positionable in a horizontal orientation and has a generally cylindrical configuration and an upwardly extending projection in the central extent thereof formed with female screw threads therewithin. The sand bar system also includes an upper support bar. The upper support bar is spaced above the lower cross bar and extends in a horizontal orientation at right angles with respect to the lower support bar. The upper support bar is cylindrical over the majority of its extent. The upper cross bar has a laterally extending projection with a generally oval head extending from one side thereof. A coupling member is formed in a generally cylindrical configuration and is positionable in a vertical orientation with the central aperture therethrough for receiving the lower portion of the pole for coupling with respect to the projection in the lower cross bar. The coupling member has a lateral projection with an opening for receiving the oval projection of the upper cross bar.

5 Claims, 3 Drawing Sheets

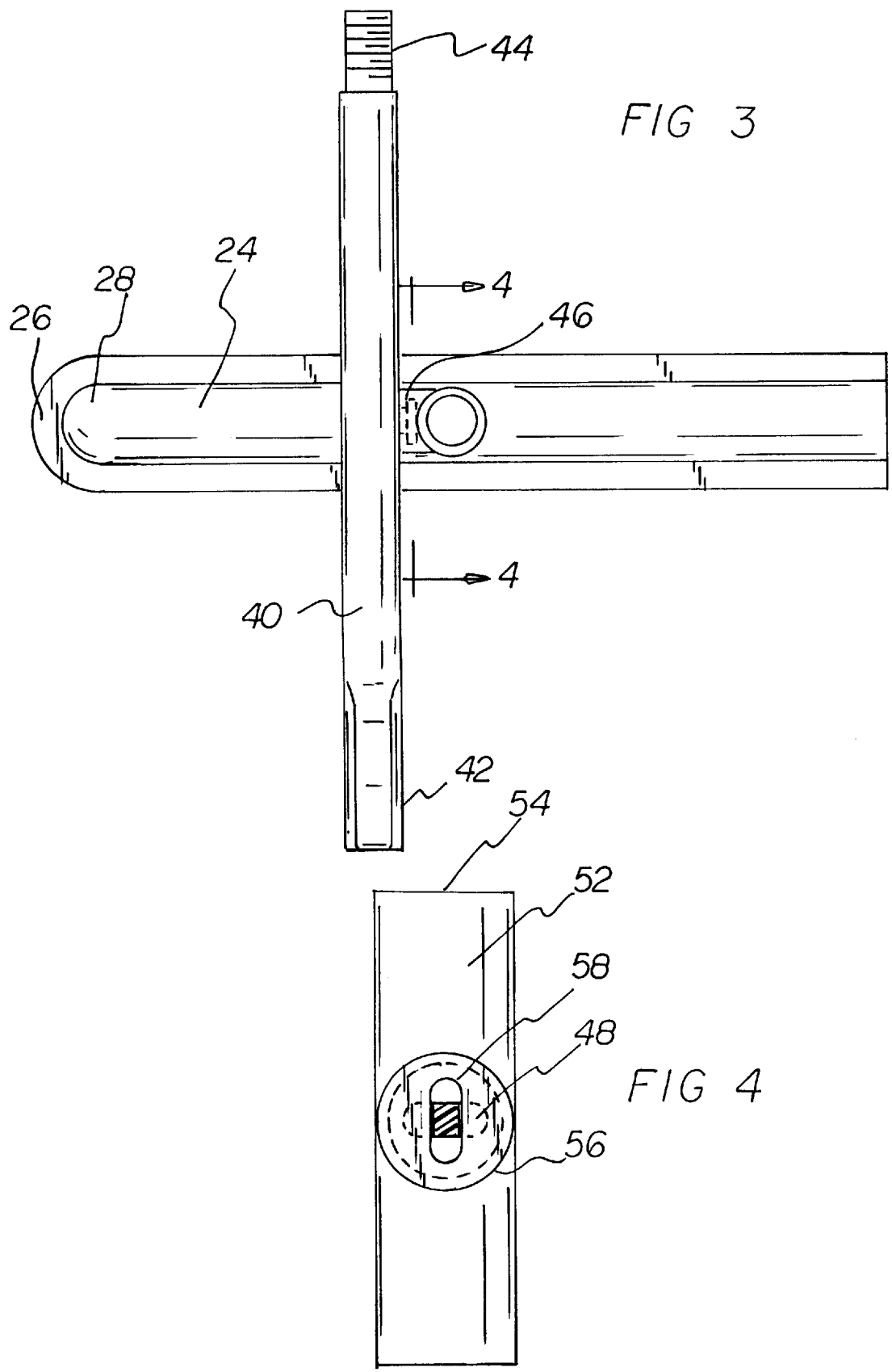

SANDBAR SYSTEM

BACKGROUND OF THE INVENTION

1. Field of the Invention

The present invention relates to a sandbar system and more particularly pertains to securely supporting a beach umbrella.

2. Description of the Prior Art

The use of umbrella support devices of known designs and configurations is known in the prior art. More specifically, umbrella support devices of known designs and configurations heretofore devised and utilized for the purpose of supporting a beach umbrella through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,524,855 to Lesar discloses an Umbrella Post Sand Anchor. U.S. Pat. No. 5,12,014 to Genfan discloses a Beach Anchoring Device. U.S. Pat. No. 5,482,246 to Derkoski discloses an Anchoring Device Having an Auger and a Spiral-Shaped Member Mounted to a Distal End of the Anchoring Device. U.S. Pat. No. 5,535,978 to Rodriguez, et al. discloses a Beach Umbrella Anchoring Apparatus. Lastly, U.S. Pat. No. 5,692,720 to Griggs discloses an Anchoring Device for Umbrellas.

While these devices fulfill their respective, particular objectives and requirements, the aforementioned patents do not describe a sandbar system as disclosed herein.

In this respect, the sandbar system according to the present invention substantially departs from the conventional concepts and designs of the prior art, and in doing so provides an apparatus primarily developed for the purpose of securely supporting a beach umbrella.

Therefore, it can be appreciated that there exists a continuing need for a new and improved sandbar system which can be used for securely supporting a beach umbrella. In this regard, the present invention substantially fulfills this need.

SUMMARY OF THE INVENTION

In view of the foregoing disadvantages inherent in the known types of umbrella support devices of known designs and configurations now present in the prior art, the present invention provides an improved sandbar system. As such, the general purpose of the present invention, which will be described subsequently in greater detail, is to provide a new and improved Sandbar system and method which has all the advantages of the prior art and none of the disadvantages.

To attain this, the present invention essentially comprises a new and improved sand bar system for securely supporting a beach umbrella. The system comprises, in combination a beach umbrella which has a generally dome-shaped cover at the top and a downwardly extending pole at the bottom, the lower end of the top be supported, the bottom end having male screw threads. A lower support bar is positionable in a horizontal orientation. The lower support bar has a generally cylindrical configuration with a planar extent along two lateral sides in the front and an upwardly extending projection in the central extent thereof. The projection is formed with female screw threads therewithin for receiving the male screw threads. Also included is an upper support bar spaced above the lower cross bar and extending in a horizontal orientation at right angles with respect to the lower support bar. The upper support bar is cylindrical over the majority of its extent with a flattened vertical first end and male screw threads at a second end for being received within the female screw threads of the aperture of the lower support bar when in the stowed orientation. The upper cross bar has a laterally extending projection with a generally oval head extending from one side thereof. Lastly included in the sandbar system is a coupling member. The coupling member is in a generally cylindrical configuration and is positionable in a vertical orientation with the central aperture therethrough for receiving the lower portion of the pole for coupling with respect to the projection in the lower cross bar. The coupling member has a lateral projection with a generally oval opening for receiving the oval projection of the upper cross bar for the coupling thereof during operation and use for facilitating the support of the beach umbrella.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved sandbar system which has all of the advantages of the prior art umbrella support devices of known designs and configurations and none of the disadvantages.

It is another object of the present invention to provide a new and improved sandbar system which may be easily and efficiently manufactured and marketed.

It is further object of the present invention to provide a new and improved sandbar system which is of durable and reliable constructions.

An even further object of the present invention is to provide a new and improved sandbar system which is susceptible of a low cost of manufacture with regard to both materials and labor, and which accordingly is then susceptible of low prices of sale to the consuming public, thereby making such sandbar system economically available to the buying public.

Even still another object of the present invention is to provide a sandbar system for securely supporting a beach umbrella.

Lastly, it is an object of the present invention to provide a new and improved sand bar system. The sand bar system includes a lower support bar. The lower support bar is positionable in a horizontal orientation and has a generally cylindrical configuration and an upwardly extending projection in the central extent thereof formed with female screw threads therewithin. The sand bar system also includes an upper support bar. The upper support bar is spaced above the lower cross bar and extends in a horizontal orientation at right angles with respect to the lower support bar. The upper support bar is cylindrical over the majority of its extent. The upper cross bar has a laterally extending projection with a generally oval head extending from one side thereof. A coupling member is formed in a generally cylindrical configuration and is positionable in a vertical orientation with the central aperture therethrough for receiving the lower portion of the pole for coupling with respect to the projection in the lower cross bar. The coupling member has a lateral projection with an opening for receiving the oval projection of the upper cross bar.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top elevational view of the system shown in FIGS. 1 and 2 taken along line 3—3 of FIG. 2.

FIG. 4 is a cross-sectional view taken along line 4—4 of FIG. 3.

The same reference numerals refer to the same parts through the various Figures.

DESCRIPTION OF THE PREFERRED EMBODIMENT

Figure 1:
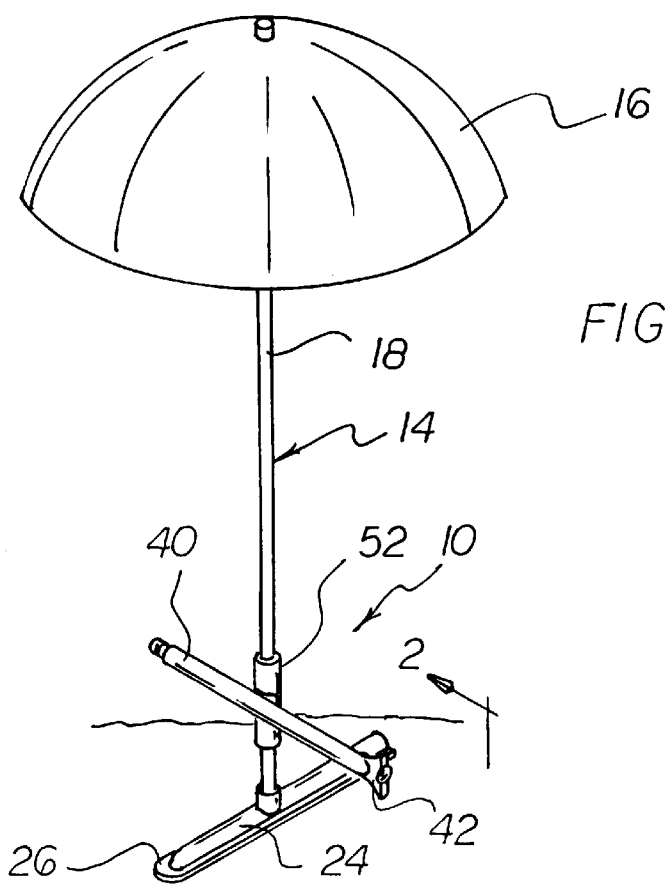
FIG. 1 is a perspective view of the preferred embodiment of the Sandbar system constructed in accordance with the principles of the present invention.
Figure 2:
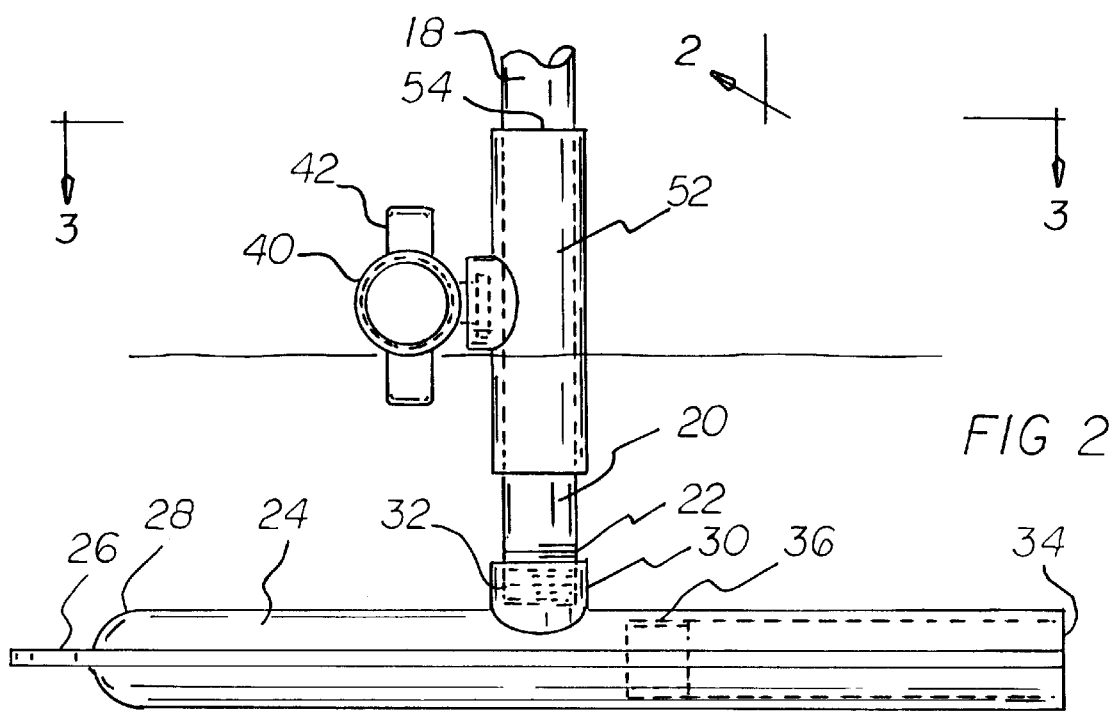
FIG. 2 is a side elevational view of the system shown in FIG. 1 taken along line 2—2 of FIG. 1.

With reference now to the drawings, and in particular to FIG. 1 thereof, the preferred embodiment of the new and improved sandbar system embodying the principles and concepts of the present invention and generally designated by the reference numeral 10 will be described.

The present invention, the sandbar system 10 is comprised of a plurality of components. Such components in their broadest context include a beach umbrella, a lower support bar, an upper support bar and a coupling member. Such components are individually configured and correlated with respect to each other so as to attain the desired objective.

The new and improved sand bar system 10 for securely supporting a beach umbrella includes a beach umbrella 14. The beach umbrella has a generally dome-shaped cover 16 at the top and a downwardly extending pole 18 at the bottom with the lower end to be supported, the bottom end 20 having male screw threads 22.

Further included in the system is a lower support bar 24. The support bar is positionable in a horizontal orientation and has a generally cylindrical configuration with a planar extent 26 along two lateral sides at the front 28 and with an upwardly extending projection 30 in the central extent thereof formed with female screw threads 32 therewithin for receiving the male screw threads, the lower support bar having an axial aperture 34 with female screw threads 36 therein. In use, the planar extent provides an enhanced substrate engagement surface for preventing movement of an umbrella associated therewith.

Additionally included in the system is an upper support bar 40 which is spaced above the lower cross bar and extends in a horizontal orientation at right angles with respect to the lower support bar for preventing movement of an umbrella associated therewith. The upper support bar is cylindrical over the majority of its extent with a flattened vertical first end 42 and male screw threads 44 at a second end for being received within the female screw threads of the aperture of the lower support bar when in the stowed orientation or shovel orientation. The upper cross bar has a laterally extending projection 46 with a generally oval head 48 extending from one side thereof. In use, the flattened verticle first end may be used as a gripping handle when the upper support bar and lower support bar are configure for use a shovel.

Lastly included is a coupling member 52 which is in a generally cylindrical configuration and positionable in a vertical orientation with the central aperture 54 therethrough for receiving the lower portion of the pole for coupling with respect to the projection in the lower cross bar. The coupling member having a lateral projection 56 with a generally oval opening 58 for receiving the oval projection of the upper cross bar for the coupling thereof during operation and use for facilitating the support of the beach umbrella.

As described hereinabove, the sandbar system of the present invention differs from the prior art references in many aspects. For example, the present invention does not make use of a pointed or spiked member that is forced into the ground. The use of cross members in the present invention that lay flat on the ground is accomplished by digging a hole with the flanged end of the shaft. The weight of the sand piled onto the elongated, flattened shafts hold the umbrella in place.

Figure 5:
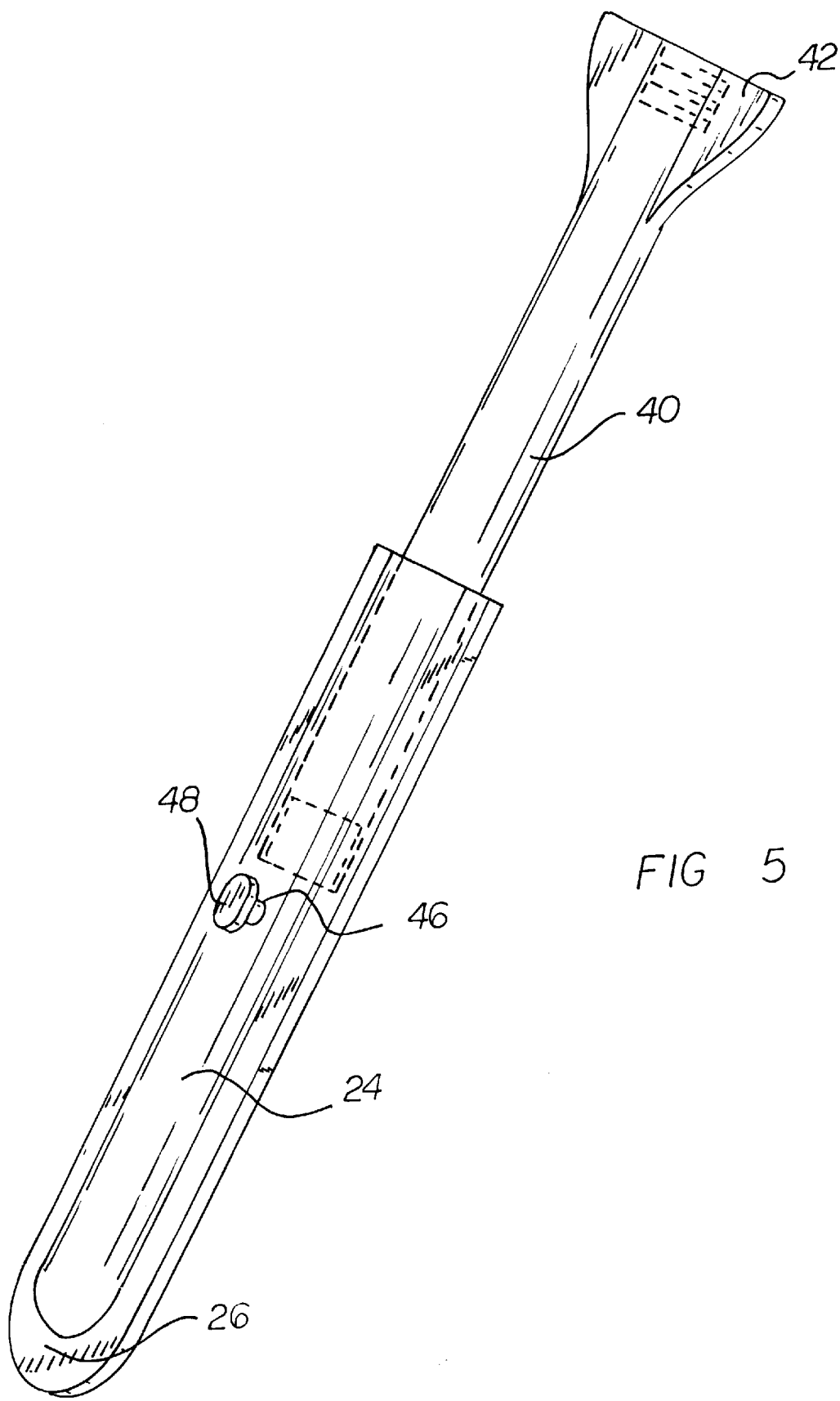
FIG. 5 is a perspective illustration of the upper and lower support bars when coupled together in the stowed orientation.

Further, as shown in FIG. 5, the present invention may be used as a shovel. The lower support bar 24 receives the upper support bar 40 whereby the male screw threads of the upper support bar engage the female screw threads of the axial aperature. This arrangement forms a shovel having a digging end formed by the planar extent of the lower support bar and a handle by the flattened verticle first end of the upper support bar.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved sand bar system for securely supporting a beach umbrella, the beach umbrella having a generally dome-shaped cover at a top thereof and a downwardly extending pole at a bottom thereof with the lower end of the pole to be supported and having male screw threads, comprising in combination:

a lower support bar positionable in a horizontal orientation and having a generally cylindrical configuration with a planar extent along two lateral sides and at a front portion thereof and with an upwardly extending projection in the central extent thereof formed with female screw threads therewithin for receiving the male screw threads of the pole and further including an axial aperture with female screw threads in one end of the lower support bar;

an upper support bar spaced above the lower cross bar and extending in a horizontal orientation at right angles with respect to the lower support bar, the upper support bar being cylindrical over the majority of its extent with a flattened vertical first end and male screw threads at a second end for being received within the female screw threads of the axial aperture of the lower support bar when in a stowed orientation and shovel orientation, the upper cross bar having a laterally extending projection with a generally oval head extending from one side thereof; and a coupling member in a generally cylindrical configuration positionable in a vertical orientation, the coupling member having a central aperture therethrough for receiving the lower portion of the pole for coupling with respect to the projection in the lower cross bar, the coupling member having a lateral projection with a generally oval opening for receiving the oval projection of the upper cross bar for the coupling thereof during operation and use for facilitating the support of the beach umbrella.

2. A sand bar system for securely supporting a beach umbrella comprising:

a lower support bar positionable in a horizontal orientation and having a generally cylindrical configuration and with an upwardly extending projection in the central extent thereof formed with female screw threads therewithin;

an upper support bar spaced above the lower cross bar and extending in a horizontal orientation at right angles with respect to the lower support bar, the upper support bar being cylindrical over the majority of its extent, the upper cross bar having a laterally extending projection with a generally oval head extending from one side thereof; and a coupling member in a generally cylindrical configuration positionable in a vertical orientation, the coupling member having a central aperture therethrough for receiving a lower portion of a pole for coupling with respect to the projection in the lower cross bar, the coupling member having a lateral projection with an opening for receiving the oval projection of the upper cross bar.

3. The system as set forth in claim 2 wherein the lower support bar has planar extents along two lateral sides and at the front.

4. The system as set forth in claim 2 and further including an axial aperture with female screw threads in one end of the lower support bar and with male screw threads at one end of the upper screw bar for coupling therebetween when in a stowed orientation and a shovel orientation.

5. The system as set forth in claim 2 wherein the lateral projection includes a generally oval opening and the laterally extending projection of the upper cross bar includes a generally oval head for the coupling therebetween.

* * * * *